United States Patent [19]

Awad et al.

[11] Patent Number: 4,996,250

[45] Date of Patent: Feb. 26, 1991

[54] WATER-DILUTABLE AIR-DRYING PROTECTIVE COATING COMPOSITIONS

[75] Inventors: Rami-Raimund Awad; Gert Dworak; Bertram Zückert; Walter Weger, all of Graz, Austria

[73] Assignee: Vianova Kunstharz, A.G., Werndorf, Australia

[21] Appl. No.: 400,787

[22] Filed: Aug. 30, 1989

[30] Foreign Application Priority Data

Aug. 31, 1988 [AT] Austria .................................. 2131/88

[51] Int. Cl.$^5$ ............................................. C08L 67/08
[52] U.S. Cl. ..................................... 523/500; 523/501; 525/63; 525/125; 525/165; 525/167.5; 525/168; 428/424.8; 428/500; 428/523
[58] Field of Search ................... 523/500, 501; 525/63, 525/125, 165, 167.5, 168; 428/424.8, 500, 523

[56] References Cited

U.S. PATENT DOCUMENTS 4,094,836  6/1978  Yasui et al. ...................... 524/597
4,436,849  3/1984  Aihara et al. ..................... 523/501

*Primary Examiner*—John Kight, III
*Assistant Examiner*—S. A. Acquah
*Attorney, Agent, or Firm*—A. W. Breiner

[57] ABSTRACT

The invention relates to water-dilutable, air-drying protective coating compositions based on a combination of select water-dilutable alkyd resins with aqueous polymer dispersions and maleinized oils or fatty acids. The products are used with or without pigments, extenders and/or paint adjuvants or additives, depending on the particular end application, as air-drying protective coating compositions for wood and metal substrates, particularly for brushing lacquers and wood varnishes.

7 Claims, No Drawings

WATER-DILUTABLE AIR-DRYING PROTECTIVE COATING COMPOSITIONS

FIELD OF INVENTION

This invention relates to water-dilutable air-drying protective coating compositions. More particularly, the invention relates to protective coating compositions which will dry in ambient air based on combinations of water-dilutable alkyd resins, aqueous polymer dispersions, and maleinized oils or fatty acids. The compositions are used in protective coatings for wood and metal substrates, particularly for brushing lacquers and wood varnishes.

SUMMARY OF INVENTION

There is and has been a desire to replace organic solvents in air-drying paints and lacquers with water both from the standpoint of the environment and cost. In spite of substantial effort in this regard, as evidenced by the large number of patents relating to this technology, products only partly meeting this objective are available.

It has now been found that by combining specific water-dilutable alkyd resins with polymer dispersions and maleinized oils or fatty acids, water-dilutable air-drying coating compositions requiring only low amounts of organic solvents are obtained which satisfy the many and varied demands of the consumer better than the products currently available.

The present invention, therefore, relates to air-drying protective coatings which are water-dilutable after partial or total neutralization of the carboxyl groups with bases, comprising -

(A) 4% to 95% by weight, preferably at least 30% by weight, of a water-dilutable alkyd resin which contains 30% to 70% of oxidatively drying fatty acids and in which at least 80% of the free carboxyl groups corresponding to an acid number of 25 to 70 mg KOH/g originate from methacrylic acid units which are grafted onto at least part of the fatty acid components, together with other vinyl and/or (meth)acrylic monomers, (B) 4% to 95% by weight, preferably at least 20% by weight, of an aqueous polymer dispersion based on (meth)acrylic acid esters, and/or butadiene, and/or styrene copolymers, and/or an aqueous polyurethane dispersion, and (C) 1% to 30% by weight, preferably 5% to 20% by weight, of an adduct of maleic acid anhydride with drying oils and/or with the unsaturated fatty acids synthesized from such oils and/or with synthetically produced esters of these fatty acids with diols or polyols, the anhydride structures of the adduct being opened by water and/or monoalcohols having from 1 to 10 carbon atoms, and which has an acid number of between 40 and 280 mg KOH/g, with the proviso that the sum of the percentages of components (A) to (C) is 100.

Pigments, extenders, and/or paint adjuvants, and/or additives which are determined by the intended end application of the coating compositions can be used as desired.

The coating compositions according to the invention are easy to work with and produce films with excellent flow properties, high elasticity, and outstanding weather resistance. Wood varnishes produced from the compositions of the invention exhibit good penetration and a good protective effect. The content of organic auxiliary solvents can be reduced to less than 5% by weight of the volatile paint component.

Component (A) of the combination according to the invention are alkyd resins such as are described in U.S. Ser. No. 07/207,870 filed Jun. 17, 1988 abandoned. Such alkyd resins have a content of free acid groups corresponding to an acid number of 25 to 70 mg KOH/g, with at least 80% of these acid groups originating from methacrylic acid units which together with other vinyl and/or (meth)acrylic monomers have been grafted in a separate reaction step onto the unsaturated fatty acids used. The content of the drying and/or semi-drying fatty acids is between about 30% and 70% by weight. Of these fatty acids, a proportion of from about 10% to 40% by weight, based on the weight of resin, is introduced in the form of the fatty acid-methacrylic acid copolymers. Furthermore, the alkyd resins contain from about 10% to 25% by weight of polyalcohols having 2 to 6 hydroxyl groups, 10% to 20% by weight of aromatic and/or aliphatic dicarboxylic acids, 0% to 15% by weight of cyclic and/or polycyclic monocarboxylic acids and 0% to 5% by weight of a polyethylene glycol. The end products have an intrinsic viscosity of between 7 and 16 ml/g, measured in chloroform at 20 C.

In order to produce the grafted fatty acids, unsaturated fatty acids with an iodine number of over 135, and preferably 160 to 200, and with the double bonds in a predominantly isolated position are used. Examples of suitable fatty acids include linseed oil fatty acid, safflower fatty acid and the fatty acids of hemp, lallemantia, perilla and stillingia oil. If desired, up to 25% by weight of dehydrated castor oil fatty acid or a comparable conjugated fatty acid prepared by isomerization can be used. The fatty acid graft copolymers are made up of 30% to 50% by weight of the above-mentioned fatty acids, 10% to 25% by weight of methacrylic acid, and 30% to 55% by weight of other monomers which apart from the —C=C— double bond do not carry any other functional groups, with the percentages of these compounds adding up to 100%. The monomers used in addition to methacrylic acid include preferably (meth)acrylic compounds and vinyl compounds, with the proviso that at least 80% by weight of the monomers must be compounds which form homopolymers soluble in petrol. Esters of methacrylic acid and acrylic acid with n-butanol, isobutanol, tert.-butanol or 2-ethylhexanol, inter alia, are suitable. Vinyl toluene can be used to adjust the film hardness of the copolymer to the optimum range. It is also possible to use small amounts, i.e., up to 20% by weight, of monomers which form petrol-insoluble polymers such as methylmethacrylate or styrene.

The graft copolymerization is carried out so that the majority of the fatty acid is heated to 110° C. to 150° C., optionally in the presence of small amounts of inert solvents, and the mixture of monomers with a suitable initiator and the remaining fatty acid is added over a period of several hours. The reaction mixture is then maintained at the reaction temperature until analysis of the residue shows a polymerization conversion of more than 95%. Examples of suitable initiators include di-tert.-butylperoxide, tert.-butylperbenzoate, and cumene hydroperoxide. The fatty acid/methacrylic acid graft copolymers thus prepared are processed together with other fatty acids to yield water-soluble alkyd resins.

The fatty acids which can be used in this step include vegetable and animal fatty acids with an iodine number of about 120. Preferably some of the double bonds are present in the conjugated position. Suitable acids include soya, linseed oil, safflower oil, tall oil, and castor oil fatty acids.

The polyols and dicarboxylic acids which can be used to produce the alkyd resins can be any of the components used to produce conventional alkyd resins. The preferred polyols are trimethylolethane, trimethylolpropane, pentaerythritol, and sorbitol. The preferred dicarboxylic acids are ortho- or isophthalic acid and adipic acid. In order to regulate the film hardness of the products, cyclic or polycyclic monocarboxylic acids such as resin acids or benzoic acid can be used. If desired, it is also possible to incorporate amounts of up to 5% by weight of polyethyleneglycols having a molecular weight of from 1000 to 3000.

The esterification can be carried out by heating the components together. When raw materials with a high melting point are used, such as pentaerythritol and isophthalic acid, it is desirable to first esterify the fatty acids, polyols, and dicarboxylic acids until a clear melt is obtained and only then add the fatty acid/methacrylic acid copolymer. Esterification is then continued so that the final value of the acid number corresponds to about 90% of the concentration of carboxyl groups in the methacrylic acid. Since these acid groups are in the tertiary position in the copolymer chains and are thus sterically hindered, it can be assumed that they will esterify substantially more slowly than the other carboxyl groups, and after the reaction has ended will yield the majority of free acid groups which bring about the water-solubility of the resins.

Suitable organic, water-compatible co-solvents which are suitable for use according to the invention include the methyl, ethyl and butyl ethers of ethyleneglycol, diethyleneglycol, 1,2-propyleneglycol, and dipropyleneglycol. Solvents with only limited water compatibility, such as n- and isobutanol, can also be used in minor amounts. The total content of organic solvents in the finished lacquer should be kept as low as possible.

The acid groups of the compositions can be neutralized with ammonia, triethylamine, dimethylethanolamine, KOH, NaOH, or LiOH. Ammonia is the preferred neutralizing agent. However, the alkyd resins can be used in either the neutralized or non-neutralized form in a solution in water-compatible solvents. It is preferable to use products in the form of aqueous emulsions, since this expediency substantially reduces the content of organic solvents which are necessary.

Component (A) is used in an amount of from 4% to 95% by weight, based on the sum of the binders, i.e., components (A) to (C). Preferably, the combination of (A) to (C) contains at least 30% by weight of component (A).

Component (B) comprises an aqueous polymer dispersions based on (meth)acrylic acid ester and/or butadiene and/or styrene copolymers, as well as polyurethane dispersions. These materials are commercially available under various brand names; for example, MOWILITH VSW 6866 and MOWILITH DM 772, which are acrylate copolymer dispersions made by Hoechst, A.G.; NEOCRYL XK 62, a styrene-acrylate copolymer dispersion made by Polyvinyl Chemie; ACRONAL 603, an acrylate dispersion made by BASF, A.G.; LITEX CA, a styrene-butadiene copolymer dispersion made by Chemische Werke Huls, A.G.; and DAOTAN VTW 1210, a polyurethane dispersion made by Hoechst, A.G. All the product names listed are registered trademarks of the manufacturers specified.

Component (B) is used in an amount of 4% to 95% by weight, based on the sum of the binders, i.e., components (A) to (C). Preferably, the combination contains at least 20% by weight of component (B).

Component (C), which is used in an amount of 1% to 30% by weight, and preferably 5% to 20% by weight, based on the sum of the binders, constitutes an adduct of maleic acid anhydride with drying oils or with the unsaturated fatty acids which constitute such drying oils and/or with hydroxyl-free synthetically produced esters of these fatty acids with diols or polyols. The anhydride structures are opened up before neutralization by reacting with water and/or monoalcohols having from 1 to 10 carbon atoms. The raw materials for these adducts and the methods of producing these adducts are known from the literature. The proportion of maleic acid anhydride used in the adducts which is suitable for the present invention is between about 5% to 30% by weight, and preferably between 7.5% and 25% by weight, based on the adduct.

The coating compositions may contain as a component (D) the usual pigments and extenders as well as paint adjuvants or additives. The choice and quantity of these materials will depend on the particular intended end application of the coating composition.

Components (A) and (C) are preferably mixed after neutralization of the carboxyl groups; then component (B) is added, optionally after the addition of some of the water provided for dilution. The binder combination is processed with the constituents of component (D) in a conventional manner.

EXAMPLES AND PRESENTLY PREFERRED EMBODIMENTS

The examples which follow illustrate the invention without restricting its scope. All the parts and percentages given are units by weight, unless otherwise stated.

(I) Preparation Of Component (A)

Preparation Of Fatty Acid Copolymer A1

30 parts of linseed oil fatty acid and 5 parts of xylene are heated to the range of from about 135° C. to 140° C. At such temperature a mixture of 32 parts of isobutylmethacrylate, 6 parts of vinyl toluene and 21 parts of methacrylic acid and a further mixture of 11 parts of the linseed oil fatty acid, 3 parts of tert.-butylperbenzoate, 1 part of 50% dibenzoylperoxide, and 5 parts of xylene are simultaneously added in uniform manner over a period of about 6 to 8 hours. After all of the mixtures are added, the reaction temperature is maintained until measurement of the residue shows that the polymerization conversion is at least 95%. If the reaction is proceeding too slowly, 1 part of tert.-butylperbenzoate can be added to the mixture. The copolymer has an acid number of 209 mg KOH/g and an intrinsic viscosity of 5.5 ml/g, measured in dimethylformamide at 20° C.

Preparation Of The Alkyd Resin

In a suitable reaction vessel, 200 parts of safflower fatty acid, 110 parts of isomerized linolic acid (about 50% 9,11-linolic acid), 115 parts of pentaerythritol, and 100 parts of isophthalic acid are esterified at about 230° C. until a clear melt has formed. After another hour at about 230° C., 340 g of fatty acid copolymer A1, as above prepared, are added; and the reaction is continued at 200° C. until the final values specified have been reached. After the inert solvent has been removed from the copolymer, the mixture is adjusted to a solids content of about 87% using ethyleneglycol monobutylether and emulsified at 50° C. with a dilute aqueous ammonia solution. The quantity of ammonia and water is selected so that the emulsion has a pH of from about 8.2 to 8.4, and a solids content of 40%. The resin solution is a liquid which ranges in appearance from milky to transparent with a marked structural-viscosity.

(II) The Following Standard Commercial Polymer Dispersions Are Used As Component (B)

(B1) A finely dispersed, moderately viscous copolymer dispersion obtained from acrylic acid esters, 46% in water, having a minimum film-forming temperature of about 40° C. (DIN 53 787), sold under the tradename SYNTHACRYL VSW 6866 by Hoechst, A.G..

(B2) A finely dispersed, moderately viscous copolymer dispersion obtained from acrylic acid esters, 46% in water, having a minimum film-forming temperature of about 14° C. (DIN 53 787), sold under the tradename MOWILITH D 772 by Hoechst, A.G..

(B3) A low viscosity, finely dispersed aqueous copolymer dispersion of acrylic and methacrylic acid esters, 50% in water, having a minimum film-forming temperature of about 16° C. (DIN 53 787), sold under the tradename ACRONAL 603 by BASF, A.G..

(B4) An anionic acrylic/styrene copolymer dispersion, 42% in water, having a minimum film-forming temperature of about 30° C. (DIN 53 787), sold under the tradename NEOCRYL XK 62 by Polyvinyl Chemie.

(B5) An aqueous, emulsifier-free polyurethane dispersion, 40% in water, sold under the tradename DAOTAN VTW 1210 by Hoechst, A.G..

(III) Preparation Of Component (C)

Component (C1): In a suitable reaction vessel, under inert gas, 700 parts of soya oil and 100 parts of maleic acid anhydride are reacted at 20° C. to 210° C. until no further free maleic acid anhydride can be detected. After the mixture has cooled to 110° C., 162 parts of diethyleneglycol monobutylether and 3 parts of triethylamine are added and the reaction is continued until an acid number of about 55 mg KOH/g is obtained. The product is diluted with methoxypropoxypropanol to a solids content of 90%.

Component (C2): In the same way as described in (C1), an adduct is prepared from 280 parts of linseed oil fatty acid and 100 parts of maleic acid anhydride, the anhydride groups of which are opened at 80° C. with 35 parts of methanol in the presence of 3 parts of triethylamine. The product has an acid number of about 240 mg KOH/g and is diluted with methoxypropoxypropanol to a solids content of 90%.

Component (C3): A mixture of 150 parts of dehydrated castor oil and 150 parts of linseed oil is stirred under inert gas at 250° C. for 1 hour and subsequently reacted with 10 parts of maleic acid anhydride at 200° C. The anhydride groups are opened at about 100° C. with 162 parts of diethyleneglycol monobutylether in the presence of 2 parts of triethylamine. The reaction product (acid number about 90 mg KOH/g) is diluted to a solids content of 90% with methoxypropoxypropanol.

Examples 1-3 and Comparison Example V(a)
Water-Dilutable Brushing Lacquers. White Using a ball mill with a stirrer mechanism, pigment pastes are prepared with component (A) having the following composition:

| Example 1: | 83 parts | |
| Example 2: | 115 parts | Component (A), 40% |
| Example 3: | 177.5 parts | |
| | 1.5 parts | 25% ammonia solution |
| | 100 parts | titanium dioxide (rutile) |
| | 1 part | combination dryer, water-dilutable (Co, Ba, Zr) |
| | 2 parts | anti-skin agent (oxime-based) |
| | 1 part | anti-foamer (silicone-free) |
| | 30 parts | water |

The ratios of pigment to binder in this pigment paste are 1, 2:1, and 1:0.7, respectively.

For Examples 1 to 3, the pigment paste is completed with components (B) and (C) and other additives as specified in Table 1. Comparison Example V(a) does not contain any component (C).

TABLE 1

| Example | 1 | 2 | 3 | V(a) |
| --- | --- | --- | --- | --- |
| Pigment paste from Component (A), see above | 218.5 | 250.5 | 313.0 | 218.5 |
| Slip and flow agents | 3 | 3 | 3 | 3 |
| Anti-foamer, silicone-free | 1 | 1 | 1 | 1 |
| Dispersion (B1), 46% | 127 | 95.7 | — | 145 |
| (B2) | — | — | 43.5 | — |
| Ammonia solution, 25% | 1 | 1 | 1 | — |
| Adduct (C1), 90% | 10 | — | — | — |
| (C2), 90% | — | — | 10 | — |
| (C3), 90% | — | 10 | — | — |
| Solids content of lacquer | 56% | 56% | 56% | 56% |
| Pigment-binder ratio | 1:1 | 1:1 | 1:1 | 1:1 |

After the pH has been adjusted to 8.8–9.1 using ammonia solution, the lacquers are applied to sanded whitewood boards. As a further comparison example, a standard commercial dispersion paint for wood based on dispersion (b1) was used (V(b)).

The tests were carried out as follows:

1. Brushability: The applicability of the materials was assessed subjectively on a points system (grade 1=very good; grade 5=very poor).

2. Joining Time: A wooden board was half painted with the lacquer being tested. After 5 minutes, the brushability of the edge zone was tested by applying the lacquer in stripes, at the time specified, the "join" is no longer present.

3. Drying: Drying time was recorded at 20° C. based on a film having a thickness of 15μm (wet film) on sheets of glass.

4. Readiness for Re-Painting: A wooden board is painted with the test lacquer. After 2 hours, the readiness of the paint film to receive a second coat is tested by applying the lacquer in stripes. After the time specified, a second coat can be satisfactorily applied.

5. Shelf Life of the Paint: All the paints were usable after a storage period of 4 weeks at 50° C. It was possible to adjust the pH of the paint.

6. Open-Air Weathering of the Paints or Varnishes: The paints or varnishes which contain component (C) did not exhibit any deterioration after 12 months of open-air weathering (pinewood boards, 45 degrees to the south) as regards Yellowing, absorption of dirt, cracking, and greying.

The test results are shown in Table 2.

TABLE 2

| Example | 1 | 2 | 3 | V(a) | V(b) |
|---|---|---|---|---|---|
| Brushability | 1-2 | 1 | 1 | 3-4 | 3-4 |
| Joining time (min) | 40 | 45 | 55 | 10 | 2 |
| Drying (25° C.) | | | | | |
| Non-tacky (min) | 90 | 90 | 90 | 90 | 60 |
| Bone dry (hours) | 3.5 | 4 | 4 | 2.5 | 1.5 |
| Ready for second coat (hours) | 14 | 13 | 14 | 8 | 12 |
| Open-Air Weathering Test:* | | | | | |
| Cracking | 1 | 1 | 1 | 3 | 3-4 |
| Assessment of gloss | 1-2 | 1-2 | 1-2 | 3 | 4 |
| Formation of blisters | 1 | 1 | 1 | 3 | 3-4 |
| Chalking (formation of veil) | 1-2 | 1-2 | 1-2 | 2-3 | 3 |

*These properties were assessed subjectively on a point system (grade 1 = very good; grade 5 = very poor)

Examples 4 to 8 and Comparison Example V(c) Water-Dilutable Wood Varnishes

Water-dilutable wood varnishes were produced according to the following formulations in table 3:

TABLE 3

| Example | 4 | 5 | 6 | 7 | 8 | V(c) |
|---|---|---|---|---|---|---|
| Component (A), 40% | 246.0 | 267.0 | 205.0 | 222.5 | 222.5 | 370.0 |
| Component (C1), 90% | 40.0 | — | 40.0 | — | 20.0 | — |
| (C3), 90% | — | 20.0 | — | 20.0 | — | — |
| Ammonia solution, 25% | | 4.0 | | | | |
| Siccative mixture | | 4.0 | | | | |
| Fungicidal solution | | 0.5 | | | | |
| Matting agent (2) | | 32.5 | | | | |
| KW solvent (3) | | 7.0 | | | | |
| Mixture | | | | | | |
| DEME (4) | | 7.0 | | | | |
| Anti-skin agent (1) | | 2.0 | | | | |
| Anti-settling agent (5) | | 2.0 | | | | |
| Anti-foamer (1) | | 2.0 | | | | |
| Flow agent | | 4.0 | | | | |
| Ammonia solution, 25% | 3.0 | 3.0 | 3.0 | 3.0 | 3.0 | 3.0 |
| Water | 170.0 | 135.0 | 202.0 | 170.0 | 164.0 | 225.0 |
| Component (B1) | — | 117.0 | — | — | — | — |
| Component (B2) | — | — | 97 | — | — | — |
| Component (B3) | 89 | — | — | — | — | 60.0 |
| Component (B4) | — | — | — | 128 | — | — |
| Component (B5) | — | — | — | — | 134 | — |

(1) See Example 1-3
(2) Ethylene wax/surface-treated silicic acid
(3) Paint petrol (Bp 184–207° C.)
(4) Diethyleneglycol monoethylether
(5) Modified castor oil The varnishes of Examples 4–8 and V(c) have a solids content of about 35%. After the pH is adjusted to 9.2 and the outflow time is adjusted to 30 to 35 seconds (DIN 53 211/20° C.), the varnish is applied by painting onto pinewood boards. The comparison Example V(c) was formulated without the adduct (component (C)). A standard commercial water-dilutable wood varnish was also tested as a further comparison product (Example V(d)).

The tests were carried out in the same way as in Examples 1 to 3. The results are summarized in Table 4.

TABLE 4

| Example | 4 | 5 | 6 | 7 | 8 | V(c) | V(d) |
|---|---|---|---|---|---|---|---|
| Brushability | 1 | 1 | 1 | 1 | 1-2 | 2-3 | 2-3 |
| Drying (25° C.) | | | | | | | |
| Non-Tacky (hrs) | 3 | 3 | 3 | 2 | 2 | 1 | 1 |
| Bone Dry (hrs) | 4 | 4 | 4 | 3.5 | 3 | 1.5 | |
| Ready for Second Coat (after hours) | 3.5 | 3.5 | 5 | 5 | 3.5 | 3 | 6 |
| Open-Air Weathering Test: | | | | | | | |
| Cracking | 1 | 1 | 1 | 1 | 1-2 | 2 | 3-4 |
| Blistering | 1 | 1 | 1 | 1 | 1-2 | 2-3 | 2-3 |
| Chalking | 1-2 | 1-2 | 1-2 | 1-2 | 1-2 | 2-3 | 3 |

As will be apparent to one skilled in the art, various modifications can be made within the scope of the aforesaid description. Such modifications being within the ability of one skilled in the art form a part of the present invention and are embraced by the appended claims.

It is claimed:

1. Water-dilutable, air-drying protective coating compositions, comprising
   (A) 4% to 95% by weight of a water-dilutable alkyd resin which contains from about 30% to 70% of oxidatively drying fatty acids and in which at least 80% of the free carboxyl groups corresponding to an acid number of 25 to 70 mg KOH/g originate from methacrylic acid units which are grafted onto at least part of the fatty acids, together with additional vinyl and/or (meth)acrylic monomers,
   (B) 4% to 95% by weight of an aqueous polymer dispersion based on (meth)acrylic acid esters and/or butadiene and/or styrene copolymers, and/or an aqueous polyurethane dispersion, and
   (C) 1% to 30% by weight of an adduct of maleic acid anhydride with drying oils and/or with the unsaturated fatty acids which are synthesized from such oils and/or with synthetically produced esters of such fatty acids with diols or polyols, the anhydride structures of the adduct being opened by water and/or a monoalcohol having from 1 to 10 carbon atoms, and which has an acid number of between about 40 and 280 mg KOH/g, the sum of the percentages of components (A) to (C) being 100.

2. The coating compositions according to claim 1 wherein component (A) is present in an amount of at least 30% by weight; component (B) is present in an amount of at least about 20% by weight, and component (C) is present at from about 5 to 20% by weight.

3. The coating compositions according to claim 1 or 2 further including as an additive a pigment, an extender, or paint adjuvant.

4. The coating compositions according to claim 1 or 2 wherein component (C) contains from 5% to 30% by weight of maleic acid anhydride.

5. The coating compositions according to claim 1 or 2 wherein component (C) contains from 7.5% to 25% by weight of maleic acid anhydride.

6. A brushing lacquer or wood varnish containing the coating composition of claim 1 or 2.

7. A protective coating composition the coating compositions according to claim 1 or 2 in which the quantity of organic solvent is less than 5% by weight.

* * * * *